United States Patent
Knoop

(10) Patent No.: US 10,605,317 B2
(45) Date of Patent: Mar. 31, 2020

(54) FIXING FOR A BRAKE CARRIER AND A MOUNT FOR A DISC BRAKE AND METHOD THEREOF

(71) Applicant: Meritor Heavy Vehicle Braking Systems (UK) Limited, Cwmbran, Gwent (GB)

(72) Inventor: Dietmar Knoop, Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 0 days.

(21) Appl. No.: 15/611,056

(22) Filed: Jun. 1, 2017

(65) Prior Publication Data

US 2018/0156286 A1 Jun. 7, 2018

(30) Foreign Application Priority Data

Dec. 6, 2016 (EP) ..................................... 16202554

(51) Int. Cl.
*F16D 65/00* (2006.01)
*F16D 55/227* (2006.01)
*F16D 55/00* (2006.01)

(52) U.S. Cl.
CPC ....... *F16D 65/0056* (2013.01); *F16D 55/227* (2013.01); *F16D 2055/0008* (2013.01); *F16D 2200/0013* (2013.01); *F16D 2200/0021* (2013.01); *F16D 2250/0084* (2013.01)

(58) Field of Classification Search
CPC ......... F16D 65/0056; F16D 2200/0013; F16D 2200/0021; F16D 55/227; F16D 2250/0084; F16D 2055/0008
See application file for complete search history.

(56) References Cited

U.S. PATENT DOCUMENTS

| | | | | |
|---|---|---|---|---|
| 2,844,954 A | * | 7/1958 | Marugg | B60R 25/093 188/32 |
| 5,343,985 A | * | 9/1994 | Thiel | F16D 55/227 188/72.5 |
| 5,716,024 A | * | 2/1998 | Kaufmann | D04B 15/50 242/564.5 |

(Continued)

FOREIGN PATENT DOCUMENTS

| | | | |
|---|---|---|---|
| DE | 19946891 A1 | | 3/2001 |
| DE | 102005052951 | * | 5/2007 |

(Continued)

OTHER PUBLICATIONS

European Patent Office, Extended European Search for the corresponding European Patent Application No. 16202554.8 dated May 30, 2017.

*Primary Examiner* — Melody M Burch
(74) *Attorney, Agent, or Firm* — Brooks Kushman P.C.

(57) ABSTRACT

A fixing for mounting a brake carrier of a disc brake to a mount for a disc brake and a method of assembly. The mount may be an axle mount for mounting the brake carrier on an axle of a vehicle. The fixing may include a connector for coupling the brake carrier and the mount. The connector may deform a second fixing region of the mount or brake carrier and thereby form an interference connection that restricts relative translational movement, as the brake carrier and mount are mounted together.

16 Claims, 7 Drawing Sheets

(56) References Cited

U.S. PATENT DOCUMENTS

| | | | | | |
|---|---|---|---|---|---|
| 5,884,732 | A | * | 3/1999 | Anger | B29C 39/10 |
| | | | | | 188/73.31 |
| 2008/0067015 | A1 | * | 3/2008 | Thomas | F16D 55/00 |
| | | | | | 188/73.31 |
| 2009/0314593 | A1 | * | 12/2009 | Schmandt | F16D 51/48 |
| | | | | | 188/70 R |

FOREIGN PATENT DOCUMENTS

| | | | |
|---|---|---|---|
| DE | 102005059247 | A1 | 6/2007 |
| EP | 1437521 | A1 | 7/2004 |
| JP | 2002155910 | A | 5/2002 |
| WO | 2006007892 | A1 | 1/2006 |

* cited by examiner

FIXING FOR A BRAKE CARRIER AND A MOUNT FOR A DISC BRAKE AND METHOD THEREOF

TECHNICAL FIELD

The present invention relates to a disc brake. In particular, the present invention relates to a fixing for a brake carrier and mount for a disc brake, to a disc brake assembly comprising a brake carrier, mount and fixing and also to a method of fixing a brake carrier and mount.

BACKGROUND

Disc brakes are commonly used for braking heavy vehicles such as trucks, buses and coaches.

Disc brakes conventionally comprise a brake carrier, caliper and a rotor. The carrier is arranged to carry brake pads on each side of the rotor. The caliper is slidably mounted on the brake carrier by at least one guide assembly, such that when the disc brake is actuated, the caliper is able to slide with respect to the brake carrier. As the caliper slides inboard, the brake pads are urged onto the opposing faces of the rotor in a clamping action and a braking action is effected.

In use, a disc brake is mounted to an axle of a vehicle via a mount. The disc brake and mount are typically secured together using bolts that extend through the mount and into the brake carrier.

Even when the brake carrier and mount are bolted together, it has been recognized that slippage may occur between the brake carrier and mount due to the drag torque when braking. Also, it has been found that during certain testing conditions, specifically when a vehicle undergoes a significant number of forward and reverse movement, there is a risk that the repeated slippage may cause the bolts to rotate and loosen.

The present invention seeks to overcome or at least mitigate the problems with the prior art.

SUMMARY

A first aspect of the invention provides a fixing for a brake carrier and a mount for a disc brake. The mount may be an axle mount for mounting a disc brake on an axle of a vehicle.

The fixing inter-locks the brake carrier and the mount to restrict relative movement between the brake carrier and the mount when the brake carrier is mounted on the mount.

The fixing comprises a connector to engage the brake carrier and mount. The connector comprises a protrusion to extend from a first fixing region of the brake carrier or mount and form an interference connection with a corresponding second fixing region of the mount or brake carrier, as the brake carrier and mount are brought together during mounting.

By forming an interference connection between the brake carrier and mount, the fixing is able to at least restrict or substantially inhibit translational movement between brake carrier and mount. Thus, the fixing is able to substantially avoid undesirable translational movement between the brake carrier and mount caused by dynamic loads acting on the brake disc. The fixing is also able to forestall any undesirable movement between the brake carrier and mount as a vehicle moves repeatedly forwardly and backwardly. Hence, any consequential rotation and loosening of the securing bolt is substantially averted.

The connector has a connector hardness. The first fixing means has a first hardness. The second fixing region has a second hardness. The connector hardness and second hardness are selected so that the second fixing region is deformable by the protrusion and the protrusion can be press-fitted into the second fixing region to form the interference connection. The protrusion forms a protrusion cavity in the second fixing region, in which the protrusion sits. By configuring the connector to deform the corresponding second fixing region and create an interference connection, the connector is able to provide an advantageous engaging effect with minimal fitting tolerances and without must-fit limitations. Also, the connector is suitable for engaging any suitable corresponding second fixing region of a brake carrier or mount that is deformable under a press-fit action. By way of example, the connector may have a connector hardness greater than approximately 40 HRC whilst the second fixing region may have a second hardness up to approximately 20 HRC. The connector may be formed from hardened steel with a connector hardness falling in the range of approximately 40 to 80 HRC. The second fixing region may be formed from cast iron, ductile iron, steel plate or forged steel with a second hardness falling in the range of approximately 0 to 20 HRC.

The position of the fixing between the brake carrier and the mount, the extending direction of the protrusion and/or the size and shape of the connector are preferably selected to provide a sufficient interference connection between the brake carrier and mount so as to withstand the size and/or direction of the drag forces acting brake carrier and mount during braking.

The first fixing region and second fixing region may be corresponding faces of the brake carrier and mount that abut when the brake carrier and mount are aligned during mounting. The faces may be a flange face of the brake carrier, a flange face of the mount, a region of an inboard surface of the brake carrier and/or a region of an outboard surface of the mount. Depending on the configuration and materials of the brake carrier and mount, the first fixing region may be a surface region of the brake carrier and the second fixing region may be a surface region of the mount. Alternatively, the first fixing region may be a surface region of the mount and the second fixing region may be a surface region of the brake carrier.

If one or more securing bolts are provided to securely mount the brake carrier and mount, the fixing may be positioned between the brake carrier and mount adjacent one or more of the securing bolts extending between the brake carrier and mount. The first fixing region and second fixing region may be arranged adjacent to one or more of the corresponding holes in the mount and the brake carrier for receiving securing bolts. As such, the connector will extend in a direction parallel to the direction of any securing bolts.

The protrusion of the connector may extend in an axial direction from the first fixing region towards the second fixing region. As a result, the fixing provides an axial interference connection. Alternatively, the protrusion may extend in a tangential direction from the first fixing region to form a tangential interference connection between the brake carrier and mount.

The connector may be integrally formed with the first fixing region of the brake carrier or mount. By way of example, the protrusion may be a tooth or blade extending from the first fixing region.

In an alternative embodiment, the connector may comprise a body separately formed from the first fixing region of the brake carrier or mount. The connector may comprise a receiver to be fitted in the first fixing region. The first fixing region may comprise a first cavity pre-formed in the first fixing region of the brake carrier or mount in which the receiver can be fitted. The first cavity has a first diameter and first depth to receive the receiver. When the receiver is fitted in the first cavity, the protrusion of the connector projects from the first cavity. The connector hardness and first hardness may be selected such that the first fixing means is deformable by the receiver as the receiver is fitted in the first cavity. The deformation of the first fixing means enhances the engagement of the receiver.

The connector may have any suitably shaped body, such as for example, a cylinder, sphere, ovoid or ellipsoid. In an embodiment, the connector may be a ball bearing with a substantially spherical body, whereby a first sector is the receiver fitted in the first cavity of the first fixing region and a second sector is the protrusion extending from the first fixing region. The size of the ball bearing may depend on the size and/or direction of the undesirable drag forces acting on the brake carrier and mount. The ball bearing may have diameter falling in the range of approximately 3 mm to 8 mm. In a different embodiment, the connector may be a pin with a substantially cylindrical body, whereby a first end is the receiver fitted in the first fixing region and a second end is the protrusion extending from the first fixing region.

A second aspect of the invention relates to a disc brake assembly comprising: a brake carrier of a disc brake, a mount for a disc brake and at least one fixing according to the first aspect of the invention.

The mount may be an axle mount for mounting the disc brake on an axle of a vehicle.

To securely mount the brake carrier on the mount, the disc brake assembly may further comprise one or more securing bolts, one or more bore holes formed in the mount through which the bolts extend and one or more threaded holes formed in the brake carrier into which the bolts are tightened.

The mount may be an axial mount, whereby the bolts extend in an axial direction between the brake carrier and the mount. Alternatively, the mount may be a tangential mount, whereby the bolts extend in a tangential direction between the brake carrier and the mount.

The disc brake assembly may comprise a plurality of fixings to restrict relative movement between the brake carrier and the mount. The plurality of fixings may be the same or different. By way of example, the disc brake assembly may have a plurality of fixings having ball-bearing connectors with the same or different diameters.

A third aspect of the invention relates to a method for fixing a brake carrier and mount for a disc brake comprising: providing a first fixing portion of a brake carrier or mount; providing a connector with a protrusion extending from the first fixing portion, the connector having a connector hardness; providing a second fixing portion of a corresponding mount or brake carrier, the second fixing portion having a second hardness that is less than the connector hardness and the second fixing portion being deformable by the protrusion; aligning the brake carrier and mount and press-fitting the protrusion into the second fixing region to form an interference connection between the brake carrier and mount so as to restrict relative translational movement.

If the connector is a separable body to the first fixing region, the method may comprise providing a first cavity in the first fixing region and fitting a receiver of the connector in the first cavity.

If first fixing region has a first hardness that is less than the connector hard and is deformable by the receiver, the method may comprise press-fitting the receiver of the connector in the first cavity of the first fixing region.

BRIEF DESCRIPTION OF THE DRAWINGS

Embodiments of the invention will now be described with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
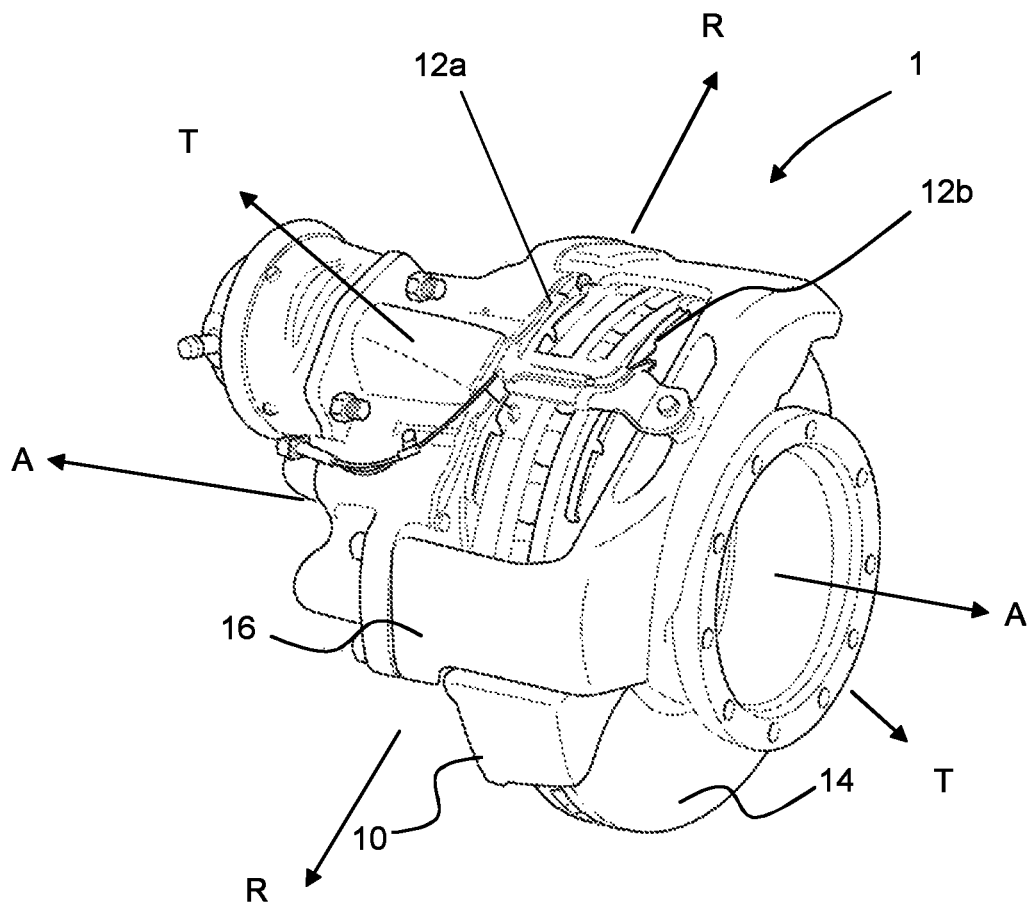
FIG. 1 depicts a disc brake according to the present invention.
Figure 2:
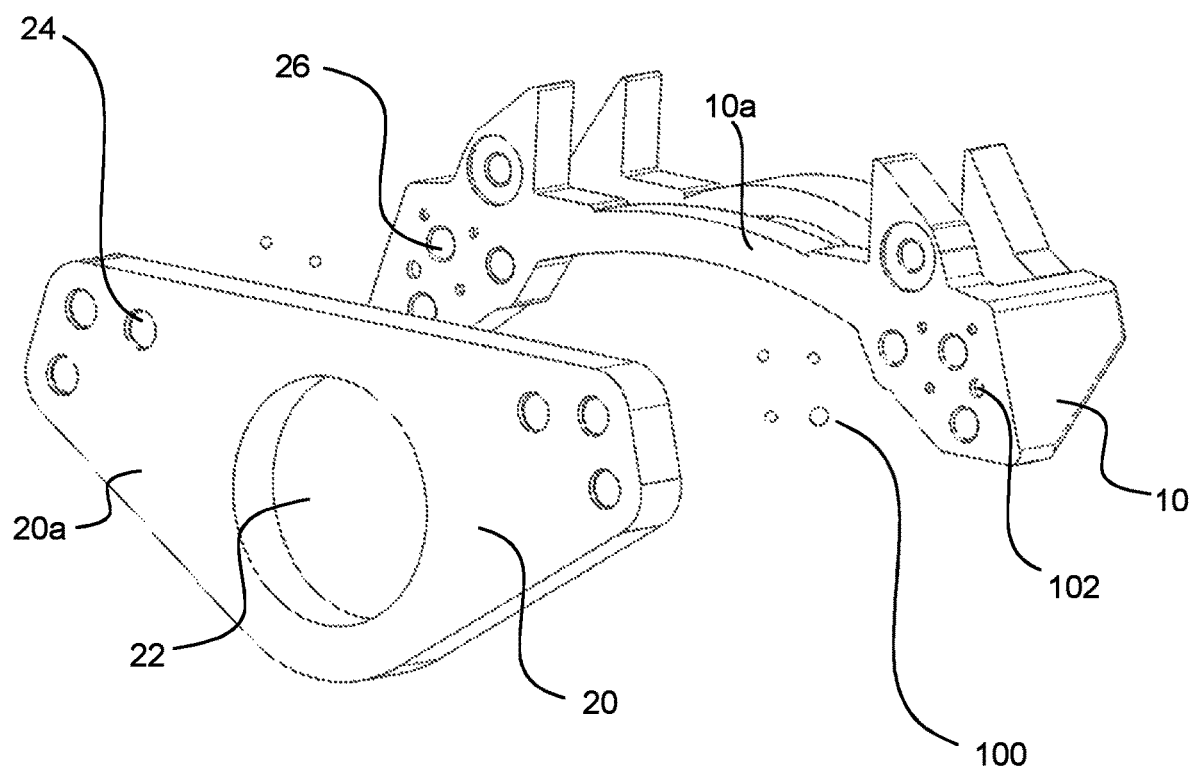
FIG. 2 is an exploded view of an embodiment of a disc brake assembly according to the present invention with a plurality of fixings.
Figure 3:
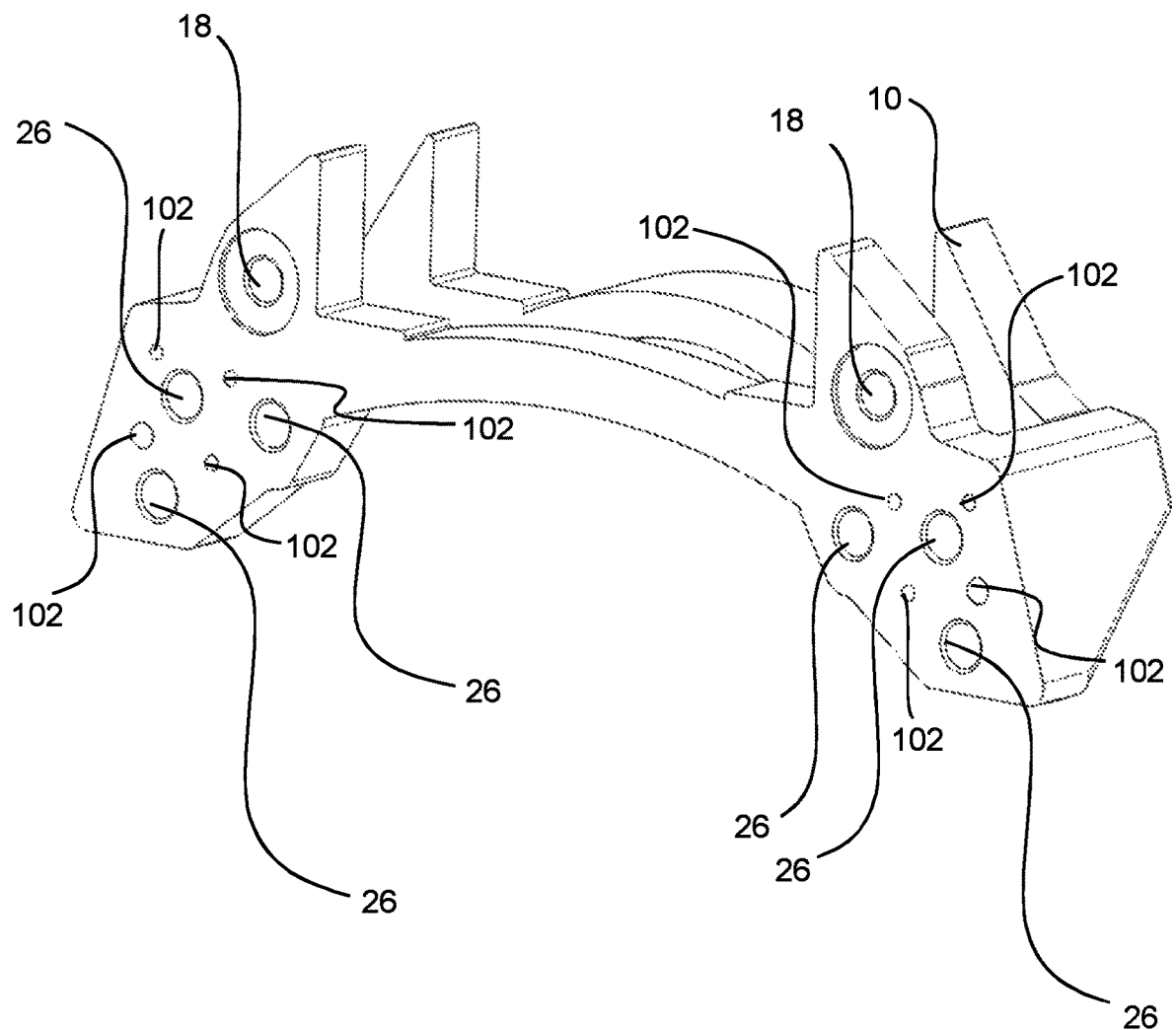
FIG. 3 is a front view of the brake carrier of the embodiment of the disc brake assembly showing the cavities for receiving ball bearing connectors.
Figure 4:
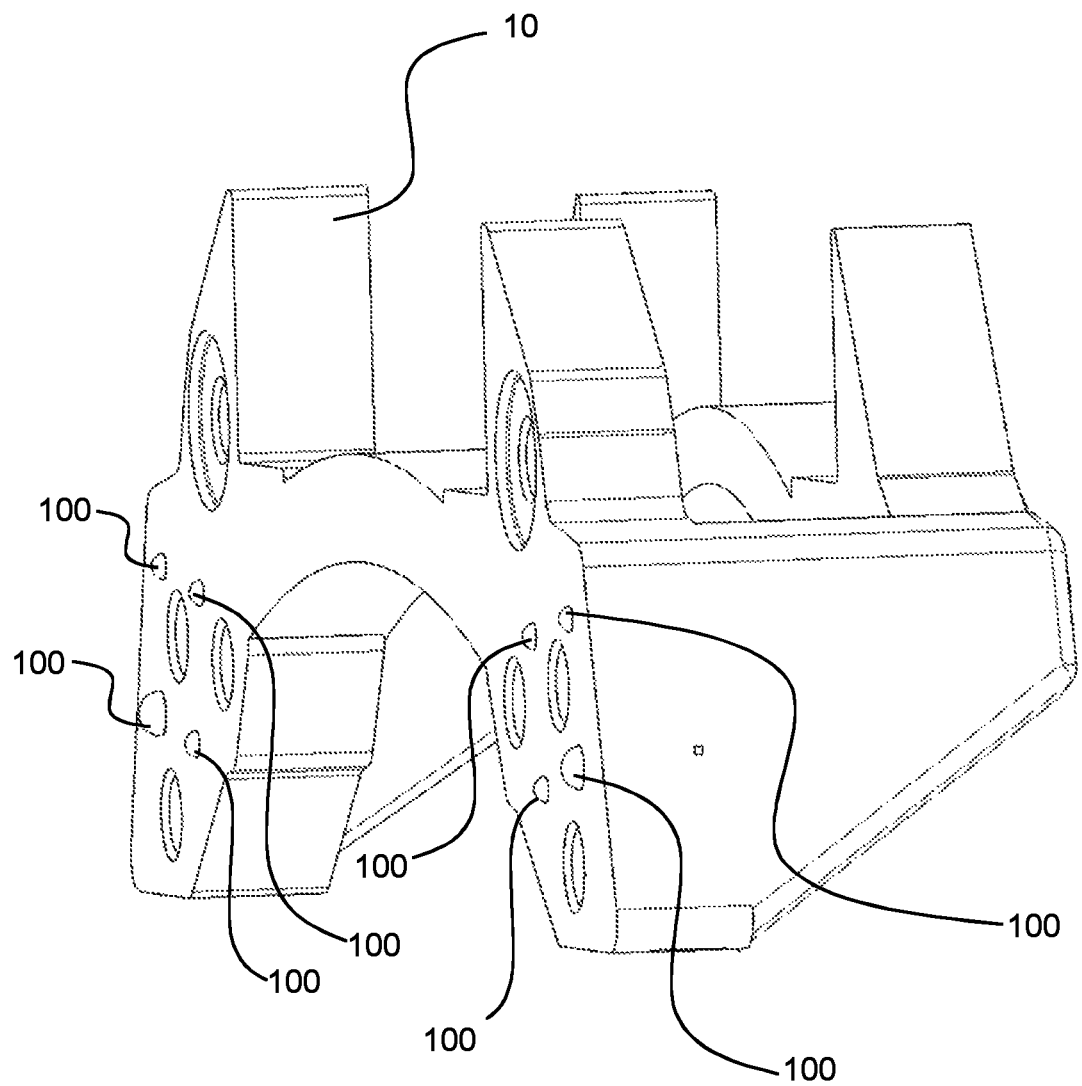
FIG. 4 is a perspective view of the brake carrier of the embodiment of the disc brake assembly showing ball bearing connectors fitted in the cavities.
Figure 5:
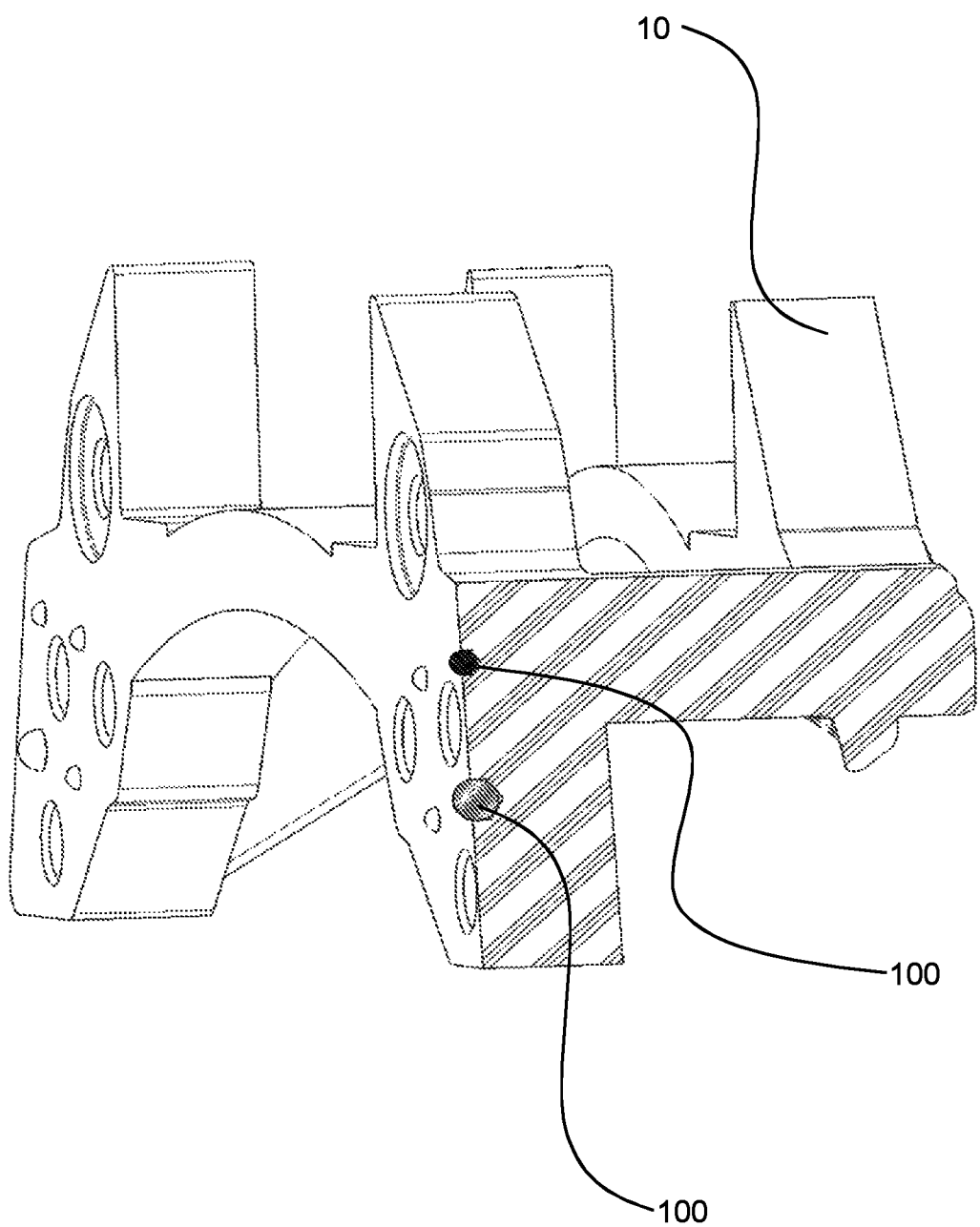
FIG. 5 is a cross-sectional view of the brake carrier of the embodiment of the disc brake assembly showing ball bearing connectors fitted in the cavities.
Figure 6:
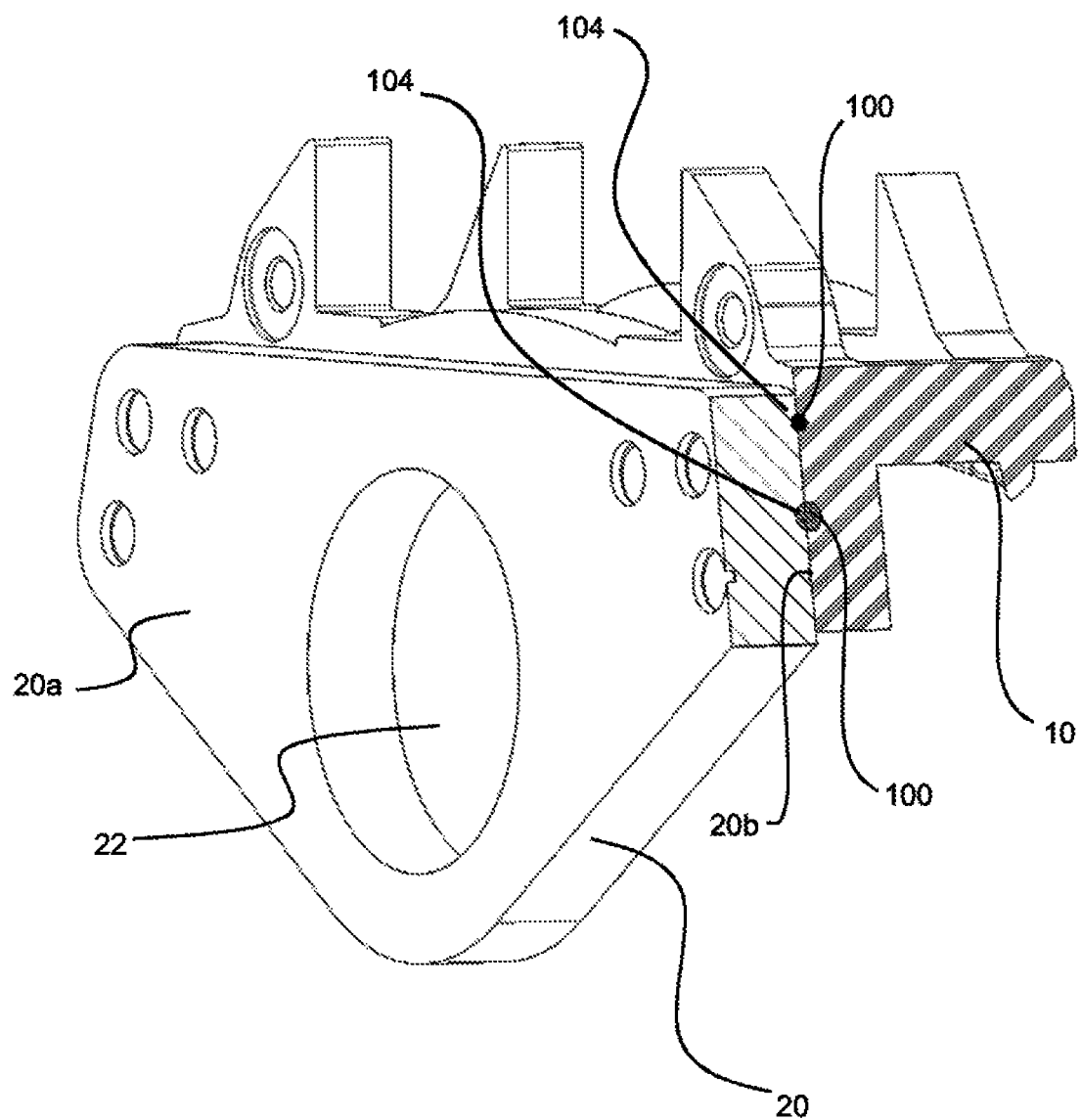
FIG. 6 is a cross-sectional view of the brake carrier and mount of the embodiment of the disc brake assembly fixed together.
Figure 7:
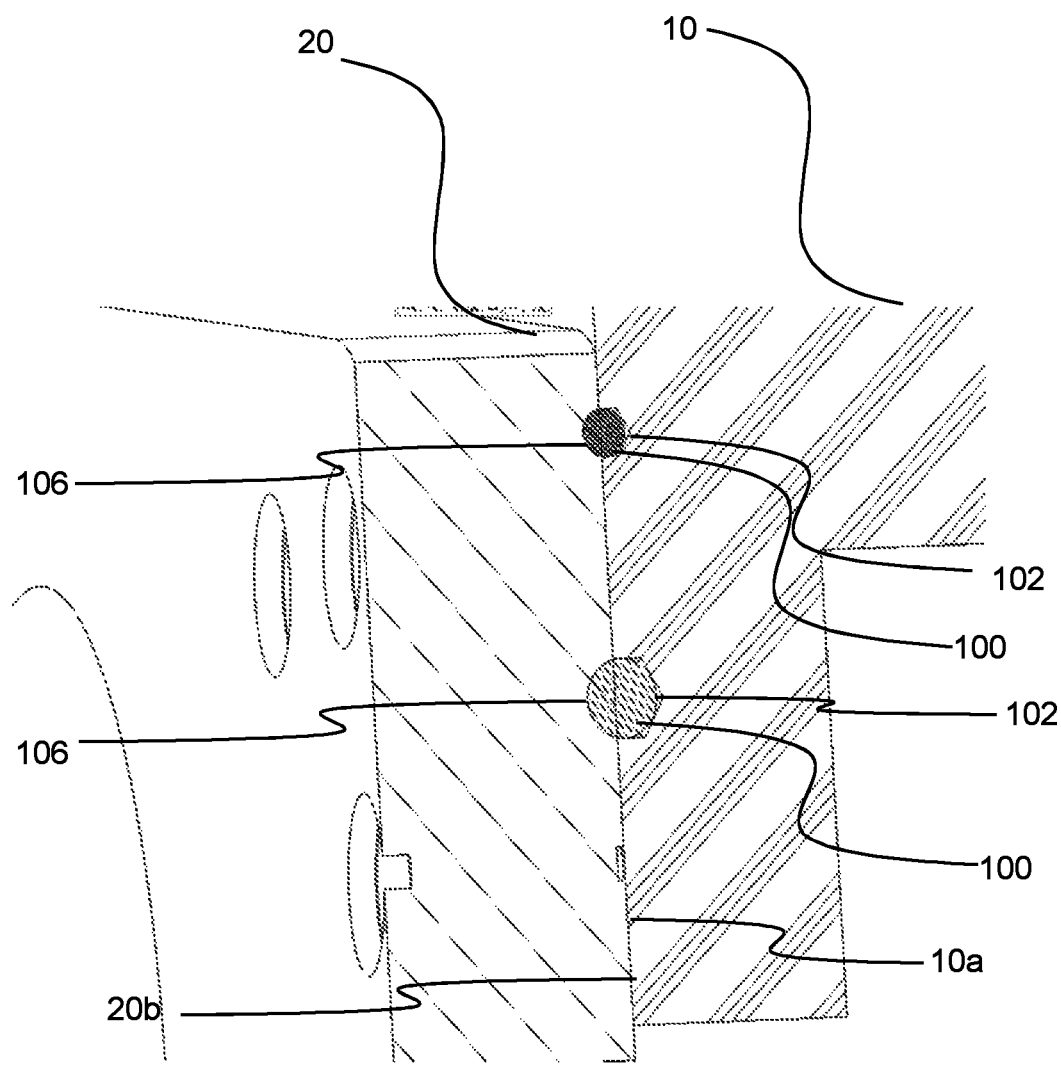
FIG. 7 is an enlarged cross-sectional view of the brake carrier and mount of the embodiment of the disc brake assembly fixed together.

Referring to FIGS. 1 to 7, a disc brake assembly according to present invention is generally indicated at 1. The disc brake assembly comprises a disc brake. The disc brake comprises a brake carrier 10. The brake carrier carries an inboard brake pad 12a and an outboard brake pad 12b. A rotor 14 is positioned between the brake pads and is rotatable about an axial axis A. A caliper 16 is slidably mounted with respect to the brake carrier 10 by at least one guide assembly.

In the embodiment depicted, the disc brake comprises two guide assemblies. Each guide assembly comprises a guide pin along which the caliper 16 can slide. Each guide pin comprises a fastener to attach the guide pin to the brake carrier 10. Each fastener is received in a complimentary bore 18 disposed in the brake carrier. When attached to the brake carrier, the guide pins extend in an axial direction, parallel to the axial axis A.

The disc brake comprises an air actuator for moving the inboard brake pad 12a into frictional contact with the rotor. When the inboard brake pad is pushed towards and contacts the rotor, the caliper slides inboard along the guide assembly. As the caliper slides inboard, it moves the outboard brake pad 12b towards the rotor. Hence the rotor becomes clamped between the inboard and outboard brake pads and the rotation of the rotor is frictionally inhibited.

The brake carrier is mountable on an axle of the vehicle via a mount 20. The brake carrier is securable to the mount using threaded bolts. Depending on the type of disc brake and mounting configuration, the mount may be an axial mount, whereby bolt axes extend in an axial direction parallel to the axis A. Alternatively, the mount may be a tangential mount, whereby bolt axes extend in a tangential direction parallel to the tangential axis T.

In the embodiment depicted in FIGS. 1 to 7, the mount 20 is an axial torque plate. The torque plate comprises a plate-like body with an axle opening 22 that is configured to receive the axle of the vehicle, an inboard surface 20a and an outboard surface 20b. When the brake carrier is mounted on the mount, an inboard surface 10a of the brake carrier 10 abuts the outboard surface 20b of the mount 20 (torque plate) torque plate. In this particular embodiment, the mount and brake carrier are securable using six threaded bolts that extend through bore holes 24 formed in the mount and into threaded holes 26 formed on the inboard side of the brake carrier. When tightened in the threaded holes, the threaded bolts extend in an axial direction, parallel to the axis of rotation A.

During use, the disc brake and mount will be subject to dynamic loads. To counter drag torque, the disc brake assembly of the present invention comprises a fixing to engage the brake carrier and mount, and thereby substantially impede undesirable slippage in directions parallel to the tangential axis T and/or radial axis R between the brake carrier and mount.

By restricting translational movement between the brake carrier and mount, the rotation of the securing bolts is substantially avoided. Thus, the subsequent loosening of the securing bolts from the brake carrier is advantageously averted.

The disc brake assembly according to an aspect of the invention may comprise one or more fixing to engage the brake carrier and the mount. In the embodiment depicted in FIGS. 1 to 7, the disc brake assembly comprises eight fixings to restrict relative translational movement.

The fixing for the brake carrier and mount comprises a connector 100 to inter-engage the disc carrier and the mount. The connector comprises a protruding portion that is configured to extend from a first fixing region 102 of the brake carrier or mount and form an interference connection with a corresponding second fixing region 104 of the mount or the brake carrier as the brake carrier and mount are brought together during mounting. The hardness of the connector and second fixing region are selected such that the second fixing region is deformable by the protruding portion. Therefore, as the brake carrier 10 and mount 20 are brought together during mounting the protruding portion is press-fitted into the deformable second fixing region, forming a protruding portion cavity 106 in which the protruding portion sits. The interference connection formed by the connector engages the fixing regions of the brake carrier and mount so as to at least constrain relative translational movements due to dynamic loads. The fixing regions of the brake carrier and mount are able to remain engaged until the brake carrier is dismounted from the mount and the protruding portion is withdrawn from the cavity formed in the second fixing region.

The fixing regions of the brake carrier and mount may be any suitable abutting surface regions of the brake carrier and mount. The fixing regions may comprise a flange face of the brake carrier and corresponding flange face of the mount. In an embodiment, the first fixing region may a surface region of the brake carrier and the second fixing region may a corresponding surface region of the mount. In an alternative embodiment, the first fixing region may be a surface region of the mount and the second fixing region may be corresponding surface region of the brake carrier. In the embodiment depicted in FIGS. 1 to 7, the first fixing region 102 is a region of the inboard surface of the brake carrier 10a. The second fixing region 104 is a region of the outboard surface of the torque plate mount 20b that is formed of steel plate with a hardness of approximately 10 HRC.

To optimize the engaging effect of the fixing, the protruding portion may engage fixing regions of the brake carrier and mount positioned adjacent to the holes 26, 24 formed in the brake carrier 10 and mount 20, respectively, for the securing bolts. With this arrangement, the axis of the interference connection between the first fixing region and second fixing region is substantially parallel to the axes of the securing bolts. In the embodiment depicted in FIGS. 1 to 7, the first fixing regions are regions of the inboard surface of the brake carrier 10a and the corresponding second fixing regions are regions of the outboard surface of the mount 20b. A first group of fixing regions for four fixings are arranged adjacent a first group of holes in the brake carrier and mount for three securing bolts. A second group of fixing regions for four fixings are arranged adjacent a second group of holes in the brake carrier and mount for three further securing bolts. Due to the arrangement of the fixing regions, the connectors 100 form an interference connection extending between the fixing regions in an axial direction parallel to the axis of the securing bolts.

The connector may be integrally formed with the brake carrier or the mount and comprises a protruding portion extending from a first fixing region of the brake carrier or the mount. The integrally formed connector may comprise a protruding blade or tooth extending from the first fixing region of the brake carrier or mount.

Alternatively, the connector may be a body comprising a receiving portion and the protruding portion. The receiving portion is locatable in a first cavity pre-formed in the first fixing region 102 of the brake carrier or mount. When the receiving portion is fitted in the first cavity of the first fixing region, the protruding portion extends from the first fixing region.

The hardness of the connector and first fixing region may be selected such that the first fixing region is deformable to enhance the engagement of the receiving portion as the receiving portion is fitted into the pre-formed first cavity. The dimensions of the deformable pre-formed first cavity may be configured such that the receiving portion has to be press-fitted into the first cavity. In the embodiment depicted in FIGS. 1 to 7, the first fixing regions 102 are regions of the inboard surface of the brake carrier that is formed of cast iron and has a hardness of approximately 11 HRC.

The connector may be any suitably shaped body. In the embodiment depicted in FIGS. 1 to 7, the connector 100 is a ball bearing with a substantially spherical body. A first sector of the ball bearing forms the receiving portion and is fitted in semi-spherical first cavity in the first fixing region 102. A second sector of the ball bearing forms the protruding portion that projects away from the first fixing region when the receiving portion is fitted in the first fixing region. In the embodiment depicted in FIGS. 1 to 7, certain fixings have a ball bearing with a diameter of approximately 4 mm and other fixings have a ball bearing with a diameter of approximately 6 mm. The ball bearings are formed from hardened steel and have a connector hardness of approximately 60 HRC.

As an alternative to ball bearing connectors, the connector of a fixing may comprise a pin, where the first cavity is disposed in the first fixing region to receive a first end of the pin and the second end of the pin protrudes above the first fixing region and is press-fitted into the second fixing region.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fixing for a brake carrier of a disc brake and mount of the disc brake comprising:
    a first fixing region provided with the brake carrier or the mount such that the first fixing region is not a through hole;
    a connector that engages the brake carrier and the mount, the connector having a connector hardness; and
    a second fixing region provided with the other of the mount or the brake carrier, the second fixing region having a second hardness less than the connector hardness and the second fixing region being deformable by the connector, Wherein the second fixing region is not a through hole;
    wherein the connector has a protruding portion that protrudes from the first fixing region into the second fixing region and deforms the second fixing region to form a cavity in which the protruding portion sits and the protruding portion is secured with an interference connection between the protruding portion and the second fixing region that restricts relative translational movement.

2. The fixing of claim 1 wherein the connector hardness is greater than approximately 40 HRC and/or wherein the connector is formed from hardened steel.

3. The fixing of claim 1 wherein the second fixing region has a hardness up to approximately 20 HRC and/or wherein the second fixing region is formed from cast iron, ductile iron, forged steel, and/or steel that is deformable by the protruding portion.

4. The fixing of claim 1 wherein the protruding portion extends in an axial direction from the first fixing region towards the second fixing region or wherein the protruding portion extends in a tangential direction from the first fixing region towards the second fixing region.

5. The fixing of claim 1 wherein the connector is integrally formed with the first fixing region.

6. The fixing of claim 4 wherein the first fixing region further comprises a first cavity and the connector further comprises a body separately formed from the first fixing region, wherein the body has a receiving portion that is locatable in the first cavity and the body includes the protruding portion.

7. The fixing of claim 6 wherein the receiving portion of the connector has the connector hardness and the connector hardness is sufficient to deform the first cavity when the receiving portion is located in the first cavity.

8. The fixing of claim 7 wherein the connector comprises a ball bearing having a substantially spherical body and a first sector of the ball bearing is the receiving portion and a second sector of the ball bearing is the protruding portion.

9. The fixing of claim 8 wherein the ball bearing has a diameter falling in a range of approximately 3 mm to 8 mm.

10. The fixing of claim 1 wherein the mount is an axial mount or a tangential mount.

11. The fixing of claim 1 wherein the connector is completely disposed between the mount and the brake carrier.

12. A method for assembling a disc brake assembly, the method comprising:
    providing a brake carrier having a first fixing region that is a blind hole;
    providing a mount having a second fixing region; and
    providing a connector that is received in the first fixing region, wherein the connector is a ball bearing; and
    assembling the brake carrier, mount, and connector by pressing the brake carrier and the connector against the mount to cause the connector to deform the second fixing region and form an interference fit with the second fixing region, thereby restricting relative movement between the brake carrier and the mount.

13. A method for assembling a disc brake assembly, the method comprising:
    providing a mount having a first fixing region that is a blind hole;
    providing a brake carrier having a second fixing region;
    providing a connector that is received in the first fixing region, wherein the connector is a ball bearing; and
    assembling the mount, brake carrier, and connector by pressing the mount and the connector against the brake earner to cause the connector to deform the second fixing region and form an interference fit with the second fixing region, thereby restricting relative movement between the mount and the brake carrier.

14. A method of assembling a brake carrier and a mount, the method comprising:
    providing a connector that is integrally formed with the mount, wherein the connector protrudes from a face of the mount and does not move with respect to the brake carrier;
    providing the brake carrier, the brake carrier having a brake carrier face that faces toward the face of the mount; and
    pressing the brake carrier and the mount together such that the face of the brake carrier contacts the face of the mount, and the connector is pushed into the brake carrier face and deforms the brake carrier to provide an interference fit between the connector and the brake carrier, wherein the connector is completely disposed between the mount and the brake carrier.

15. The method of claim 13 wherein the connector is completely disposed between the mount and the brake carrier.

16. The method of claim 12 wherein the connector is completely disposed between the mount and the brake carrier.

* * * * *

UNITED STATES PATENT AND TRADEMARK OFFICE
CERTIFICATE OF CORRECTION

PATENT NO. : 10,605,317 B2
APPLICATION NO. : 15/611056
DATED : March 31, 2020
INVENTOR(S) : Dietmar Knoop et al.

Page 1 of 1

It is certified that error appears in the above-identified patent and that said Letters Patent is hereby corrected as shown below:

In the Claims

Column 7, Line 24, Claim 1:
After "being deformable by the connector,"
Delete "Wherein" and
Insert -- wherein --

Signed and Sealed this
Eighteenth Day of August, 2020

Andrei Iancu
*Director of the United States Patent and Trademark Office*